United States Patent Office 3,684,526
Patented Aug. 15, 1972

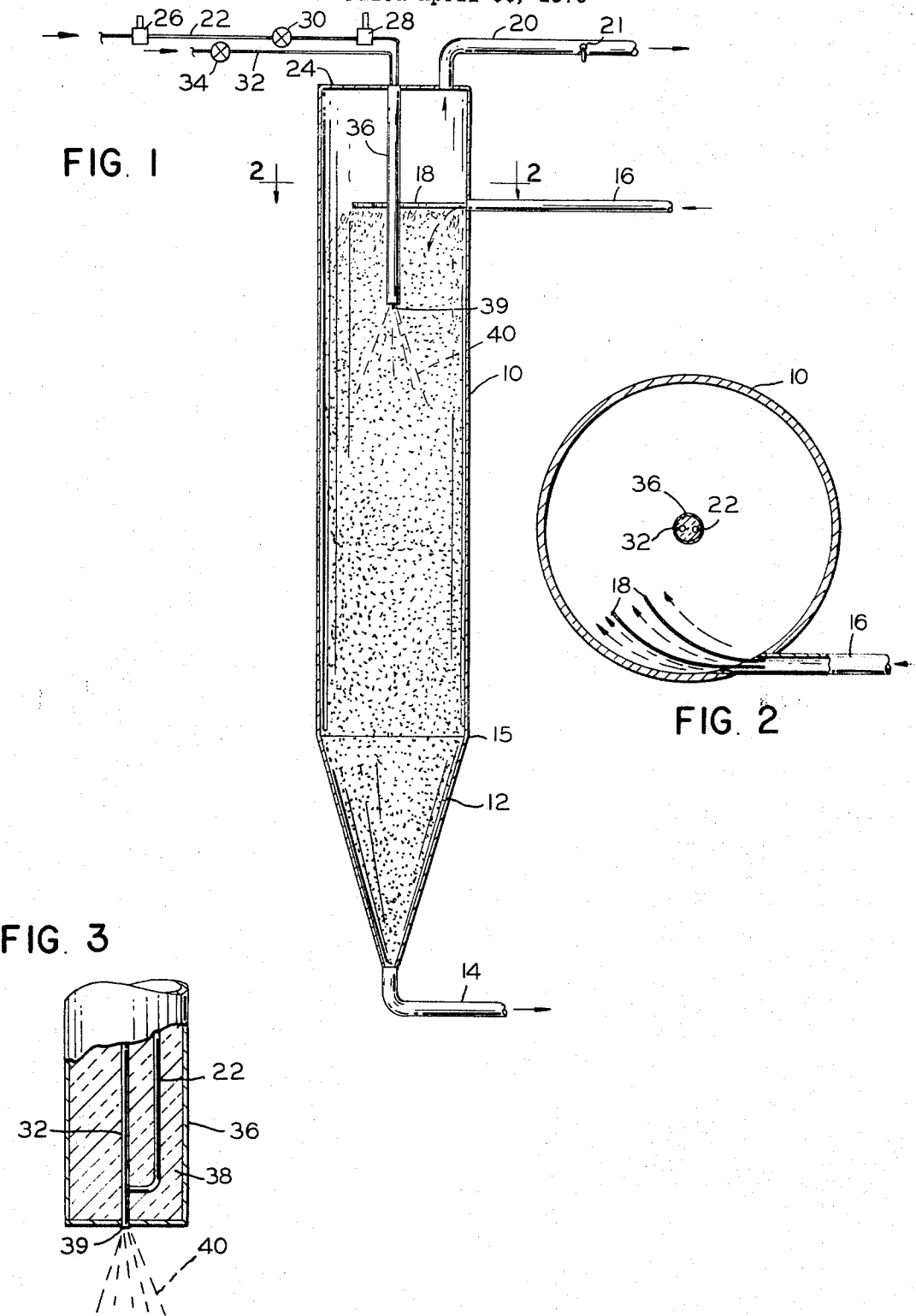

3,684,526
METHOD FOR CONTROLLING MOISTURE IN FLOUR
George M. Lowery, 10270 SW. Katherine St., Tigard, Oreg. 97223
Filed Apr. 30, 1970, Ser. No. 33,340
Int. Cl. A21d 2/00
U.S. Cl. 99—93
6 Claims

ABSTRACT OF THE DISCLOSURE

Uniform moisture control in flour is achieved by introducing flour and air under pressure into the top of a vertically elongated cylindrical bin in a manner to disperse the flour uniformly across the entire cross section thereof, the flour thereafter being permitted to fall downwardly through the bin under the force of gravity. A controlled amount of water in the form of an atomized mist is introduced axially of the bin at a point below the level at which the flour is introduced. The flour and the mist are permitted to fall together to the bottom of the bin, whereby the individual granules of flour can absorb the water without any change in their physical appearance and without the formation of any particles of dough.

BACKGROUND OF THE INVENTION

This invention relates to the art of milling and conditioning flour from wheat and, more particularly, to a method and apparatus for achieving uniform moisture control in such flour.

The proper control of moisture in bagged flour is very important both to the miller and to the baker who uses it. The many variables that occur in the milling process together with changing weather conditions tend to create erratic moisture contents in flour. Present equipment which moves flour through the mill pneumatically further tends to aggravate the problem. The result is that the miller is unable accurately to predict the weight of flour from a given amount of wheat, and the baker is unable to achieve uniform baking performance.

For many years millers have attempted to solve this problem by adding water to the grain prior to its being milled. This expedient, however, is unsatisfactory because if enough water is put on the wheat, such tends to become too soft and sticky to mill.

Methods have also been tried wherein moistened air is passed across the flour as the latter is churned by a worm in a casing. Such method was disclosed in Thomas Pat. No. 1,010,202, but this process is effective in adding only a very small amount of moisture to the flour.

I have previously tried using a spray of water directed against a falling stream of flour, but such gives only a slight improvement in the baking performance of the flour and often results in some particles having an excessive moisture content while others do not have enough.

A continuing problem which plagued all such prior attempts was the tendency of flour to turn into dough with the addition of any significant amounts of moisture thereto.

Accordingly, it is the primary object of the present invention to provide a method and apparatus for conditioning flour that will make it possible for the miller to supply the baker with a product having an absolutely uniform moisture content.

It is a further object of the present invention to provide a method and apparatus for conditioning flour which will enable the miller to supply a product the composition of which will not vary from day to day, and which will enable the baker to achieve uniform and predictable baking performance.

A further object of the present invention is to provide flour having improved baking properties.

A still further object of the present invention is to provide the baker with cake and pastry flour having sufficient as well as uniform moisture, so that he can achieve, for example, precise control of cookie spread, an important factor in the manufacture of cookies.

SUMMARY OF THE INVENTION

The process of the present invention comprises introducing flour and air under pressure into the top of a vertically elongated bin or container in a manner to disperse the flour uniformly across the entire cross section thereof and to permit the flour to fall downwardly through the container under the force of gravity. Such introduction of the flour into the container separates all the particles thereof, putting them virtually into suspension, such that they do not touch each other or anything for a substantial period of time during which they fall downwardly through the container like snow.

A controlled amount of water in the form of an atomized mist is introduced into the container centrally thereof at a point below the introduction of flour therein. The flour and the mist then fall together to the bottom of the container through a turbulence of mist and air movement, whereby the individual granules of flour can absorb the water without any change in physical appearance and without the formation of any particles of dough. Individual flour particles absorb equal amounts of moisture during this period of free fall, thereby to achieve a uniform moisture content in the flour.

The apparatus by which the invention is performed comprises an elongated cylindrical container having its axis oriented in the vertical direction and means to introduce flour and air under pressure into the top thereof in a manner to disperse the flour uniformly across the entire cross section of the container.

Means are provided to introduce a controlled amount of water in the form of an atomized mist axially of the container at a point below the level of introduction of the flour therein. The flour and mist thereafter fall together to the bottom of the container whereby the individual granules of flour can absorb the water without any change of physical appearance and without the formation of any particles of dough. Means are provided continuously to withdraw the flour from the bottom of the container such that the flour never fills the container, but flows continuously therefrom.

BRIEF DESCRIPTION OF THE DRAWINGS

FIG. 1 is a side elevational view of apparatus in accordance with the present invention.

FIG. 2 is a sectional view to an enlarged scale taken on line 2—2 of FIG. 1.

FIG. 3 is a side elevational view to an even larger scale and with parts broken away showing the means of forming the atomized mist.

DESCRIPTION OF THE PREFERRED EMBODIMENT

Referring to the drawings, the apparatus of the present invention comprises an elongated cylindrical container or bin 10 whose longitudinal axis is oriented in the vertical direction. A bin that I have found satisfactory is five feet in diameter and twenty-one feet high; that is, the height of the bin is somewhat more than four times its diameter. A generally conical hopper 12 is attached to the bottom of the bin 10 and terminates in a five inch diameter discharge spout 14 as shown. I have found an eight foot high hopper to be satisfactory for the purpose, with the diameter of its upper end 15 being equal to the diameter of the bin 10.

A three inch diameter pneumatic conveying line 16 having 330 c.f.m. capacity is provided near the top of the container 10. The line 16 carries finished flour to the bin 10 in a continuous flow together with air which is desirably maintained at a pressure of between six and eight p.s.i.

As shown in FIG. 2, the line 16 communicates with the top of the container 10, preferably tangentially thereof. Mounted at the point of communication of the line 16 and within the container 10 are several arcuately curved baffle plates 18 which give the flour and air as they enter the container a rotary motion which continues as the flour falls through the container toward the hopper 12.

A five inch diameter suction line 20 having a damper control valve 21 communicates with container 10 at its top and leads to a dust collector. Line 20 serves to keep the dust down.

Introducing the flour with air under pressure in the manner above described disperses the flour uniformly across the entire cross section of the container 10, separating all the particles and putting them in virtual suspension such that they do not touch each other or anything else for a substantial period of time during which they fall downwardly like snow through the relatively large area of the bin. The introduction of the air under pressure through line 16 is important in that it keeps the individual particles of flour whirling and separated long enough to absorb an equal amount of moisture.

Means are provided to introduce a controlled amount of water in the form of an atomized mist centrally and axially of the container 10 at a point below the level of introduction of the flour therein, such that the flour and the mist can thereafter fall together to the bottom of the container over a substantial distance. Such means desirably comprise a one-quarter inch diameter water line 22 which enters the bin 10 at the top 24 and runs axially thereof approximately one-third of the way down. Line 22 is provided with a standard water pressure stabilizer 26, a flow meter 28 calibrated to measure gallons per hour, and a control valve 30. A one-quarter inch diameter air line 32 also enters the bin 10 at its top 24 and runs parallel to line 22. Line 32 is provided with a control valve 34 and carries air which desirably is maintained at a pressure ranging between 90 and 150 p.s.i.

Lines 22 and 32 are placed in a four inch diameter aluminum tube 36 (see FIG. 3) during the portion of their length inside the bin 10. The tube 36 is itself packed with fiberglass insulation 38 to prevent the possibility of any condensation of water on the outside which might tend to form droplets of dough. I have found that if the atomized mist discharged into the container touches any uninsulated metal part, it is likely to condense into water and form droplets of dough which will disrupt the process.

As shown in FIG. 3, the waterline 22 introduces water into the airline 32 just prior to the point 39 at which the line 32 discharges air into the bin 10. Such atomizes the water into a fine mist 40 which falls with the flour as previously described. The function of mist formation at the point 39 as hereinabove described can be provided by a standard atomizing nozzle or orifice such as the Tru-Flate syphon spray gun commercially available, or similar devices.

In conditioning flour according to the method of the present invention, finished flour and air under pressure varying between six and eight p.s.i. are conveyed through line 16 into the top of bin 10, being introduced tangentially thereof as shown in FIG. 2. The process achieves a uniform dispersion of the flour across the entire cross section of the bin and provides the flour with a rotary motion as it falls downwardly under the force of gravity like snow through the turbulence of mist and air movement within the bin. Introducing the water in the form of the atomized mist 40 at point 39 centrally and axially of the bin and at a point below the introduction of the flour avoids blowback of moisture through the suction line 20. Sufficient free fall is provided to permit the mist and the flour a considerable period of time during which they are in contact with each other, thereby to permit the individual flour granules to absorb equal amounts of moisture without any change in physical appearance and without the formation of any particles of dough. Continuously withdrawing the thus conditioned flour, such that the flour never accumulates in the bottom of the bin, achieves a flour having a uniform desired moisture content and enhanced baking qualities.

EXAMPLE

Seventeen thousand pounds per hour of seventy-five percent cake flour at a 12.2 percent moisture content were introduced into the bin 10 through line 16. Control valve 30 was set to permit 43 gallons per hour as shown on flow meter 28 to flow through line 22. The air pressure in line 32 was maintained at 140 p.s.i. and was released to the bin by means of control valve 34. A Tru-Flate syphon spray gun positioned at point 39 discharged a mist as aforementioned. The moisture content of the flour as it was discharged through line 14 was uniform throughout at 14.1 percent. The gain in moisture was thus 1.9 percent, and the flour hand enhanced baking qualities as compared with flour prior to the conditioning process.

The method and apparatus of this invention provides each and every particle of flour with a uniform moisture content. The invention stabilizes and corrects variables that unavoidably occur in the milling process including those that are caused by changing weather and humidity conditions, and corrects for the erratic and excessive drying out of the flour that is caused by the pneumatic equipment used to move it through the mill.

The thus conditioned flour has improved baking qualities and is of special assistance to the baker inasmuch as it is provided to him at a uniform moisture content, thereby to obviate problems of erratic baking performance. To the miller it assures a uniform product which is desired above all by the bakers.

While the invention has been particularly described in connection with the conditioning of flour, it will be understood that it may be used equally well with other types of food materials. Thus the invention permits of modification in arrangement and detail.

I claim:

1. A method of controlling moisture in flour comprising introducing flour and air under pressure into the top of a vertically disposed, elongated bin in a manner to disperse said flour uniformly across the entire cross section of said bin, thereby separating the particles of flour and maintaining them in a turbulent condition while permitting said particles to fall downwardly through said bin to the bottom under the force of gravity;

introducing a controlled amount of water in the form of an atomized mist substantially axailly of said bin at a point below the level of introduction of said flour therein;

permitting said flour and said mist freely to fall together to the bottom of said bin and for a distance sufficient to cause said particles of flour to absorb said mist before reaching said bottom of said bin, said individual particles of flour absorbing said mist without any change in physical appearance and without the formation of any particles of dough; and discharging said flour from said bottom of said bin.

2. The improvement of claim 1 further comprising continuously withdrawing the conditioned flour from said bottom of said bin.

3. The improvement of claim 1 in which said atomized mist is introduced at a point approximately one-third of the way down from the top of said bin.

4. The improvement of claim 1 in which said air is introduced into said top of said bin with said flour at a pressure between six and eight p.s.i.

5. The improvement of claim 1 in which said atomized mist is formed by introducing water into a stream of air at a pressure between 90 and 150 p.s.i.

6. The improvement of claim 1 in which said flour and said air are introduced into said top of said bin with a rotary motion, and flour thereafter rotating as it falls downwardly through said bin under the force of gravity.

References Cited
UNITED STATES PATENTS

| 1,010,202 | 11/1911 | Thomas | 99—93 |
| 1,174,721 | 3/1916 | Henson | 99—93 |
| 1,073,985 | 9/1913 | Herendeen | 99—93 |

RAYMOND N. JONES, Primary Examiner

U.S. Cl. X.R.

99—234

UNITED STATES PATENT OFFICE
CERTIFICATE OF CORRECTION

Patent No. 3,684,526          Dated August 15, 1972

Inventor(s) George M. Lowery

It is certified that error appears in the above-identified patent and that said Letters Patent are hereby corrected as shown below:

Column 5, line 9, "and" should be --said--.

Signed and sealed this 9th day of January 1973.

(SEAL)
Attest:

EDWARD M. FLETCHER, JR.
Attesting Officer

ROBERT GOTTSCHALK
Commissioner of Patents